Oct. 26, 1943.  W. N. OLSON  2,332,663
APPARATUS FOR CIRCULATING AND STERILIZING AIR
Filed June 19, 1942
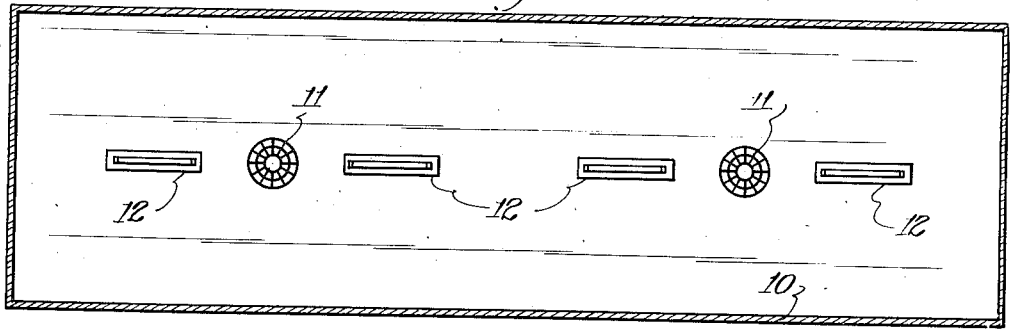
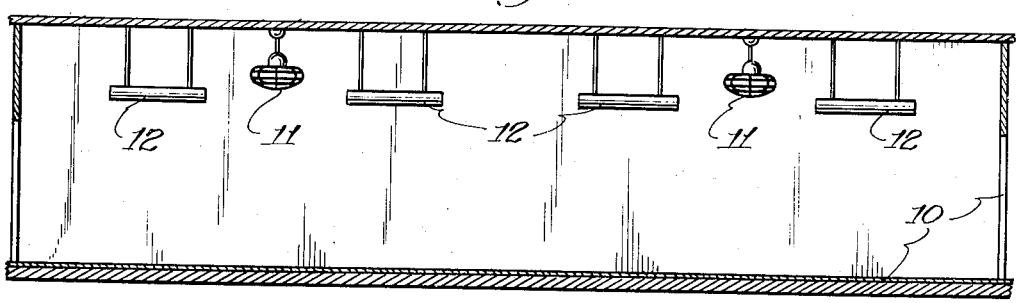
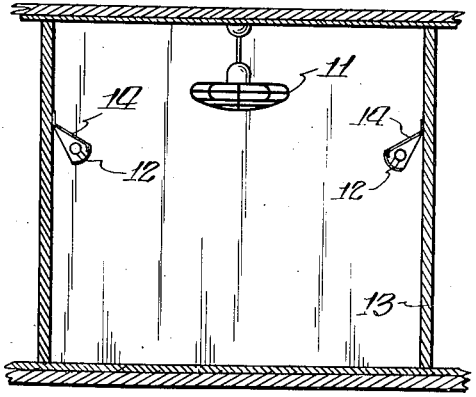
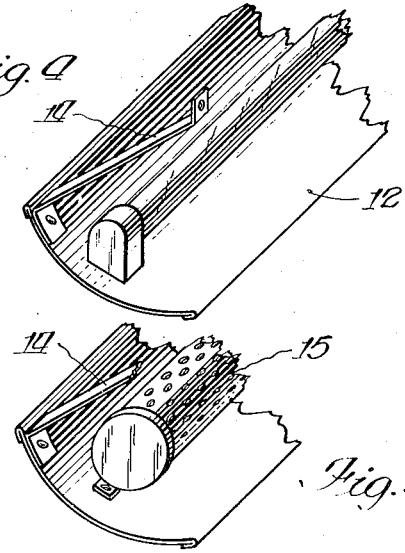
Inventor:
Waldemar N. Olson
By: Brayton Richards
Attorney Patented Oct. 26, 1943

2,332,663

UNITED STATES PATENT OFFICE 2,332,663

APPARATUS FOR CIRCULATING AND STERILIZING AIR

Waldemar N. Olson, Brookfield, Ill., assignor to Reynolds Electric Co., Chicago, Ill., a corporation of Illinois Application June 19, 1942, Serial No. 447,650

6 Claims. (Cl. 21—74)

The invention relates to improvements in methods and apparatus for circulating and sterilizing air, and has for its primary object the provision of improved means for the purpose indicated, which is of simple construction and operation and highly efficient in use.

Other objects will appear hereinafter.

The invention consists in the steps of procedure and the combinations and arrangements of parts hereinafter described and claimed.

The invention will be best understood by reference to the accompanying drawing forming a part of this specification, and in which—

Figure 1 is a horizontal section of an enclosure equipped with apparatus embodying the invention;

Fig. 2, a longitudinal section of the same;

Fig. 3, a transverse section of an enclosure equipped with a modified form of apparatus;

Fig. 4, a partial perspective view of one of two germicidal lamps employed in the construction illustrated in Fig. 3; and Fig. 5, a similar perspective view illustrating an arrangement for utilizing a volatile chemical as the germicidal agent.

The apparatus illustrated in Figs. 1 and 2 comprises an elongated enclosure 10, such as a room in a dwelling, office, hospital, refrigerator, bakery, cooling room, or other enclosure where it is desired to induce artificial and complete and adequate circulation of air, and at the same time thoroughly sterilize the same to kill or eliminate germs therefrom. A plurality of circulating fans 11 are suspended, as shown, from the ceiling of the room in central longitudinally spaced relation as indicated, and germicidal lamps 12 are arranged between said fans and at a lower level. Each of the lamps 12 embodies an upwardly-acting reflector as shown, which serves the purpose of protecting occupants of the enclosure from the direct action of the ultra-violet rays from said lamps and concentrates said rays in upwardly and outwardly divergent zones, as will be readily understood.

By this arrangement the fans 11 may be operated at sufficient speeds or capacities to project their blasts upwardly against the ceiling of the room to effect complete and adequate circulation of all the air therein at a comparatively slow speed or velocity, whereby all of the air in the room will be caused to pass through the area adjacent the ceiling and the lamps 12 are arranged to subject all of this area to a sterilizing action for a sufficient length of time to thoroughly kill or exterminate all germs therein.

In the modification illustrated in Fig. 3, a single fan 11 is suspended centrally in a substantially square room or enclosure 13 and the germicidal lamps 12 are mounted on suitable brackets 14 in spaced relation to the side walls of the room, with the reflectors of said lamps acting upwardly and outwardly as indicated. By this arrangement, a complete and adequate circulation of the air can be obtained and at the same time the air thoroughly sterilized by action of the lamps, as explained above.

In Fig. 5 I have illustrated a sterilizing agent in which a perforated cylinder 15 has been substituted for the active bulb of the germicidal lamp in the arrangement illustrated in Fig. 3. The perforated cylinder 15 is filled with a volatile germicidal chemical. By this arrangement, substantially the same effect may be obtained as through the agency of the germicidal lamps because the reflector of the lamps will now serve as a shield to concentrate the vapors emanating from the tube 15 in zones into which all of the air will be projected and through which said air will travel at comparatively low velocity of circulation of the air, as will be readily understood.

While I have illustrated and described the preferred forms of construction and the method of procedure for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. The combination with an elongated enclosure, of a plurality of circulating fans suspended from the ceiling in central longitudinally spaced relation and arranged to project their blasts upwardly against the ceiling; and a plurality of sterilizing agents located in said enclosure between and below said fans and arranged to exert sterilizing action in all of the area adjacent the ceiling.

2. The combination specified in claim 1 in which the sterilizing agents are germicidal lamps having upwardly-acting reflectors.

3. The combination with a substantially square enclosure, of a circulating fan suspended centrally from the ceiling thereof and arranged to project its blast upwardly against the ceiling; and a plurality of sterilizing agents located in said enclosure adjacent the side walls thereof and arranged to exert sterilizing action in all of the area adjacent the ceiling.

4. The combination specified in claim 3 in which the sterilizing agents are germicidal lamps having upwardly-acting reflectors.

5. The combination with an enclosure of a circulating fan suspended centrally from the ceiling thereof and arranged to project its blast upwardly against said ceiling; and a plurality of sterilizing agents located in said enclosure adjacent the side walls thereof and arranged to exert sterilizing action in all areas adjacent the ceiling.

6. The combination specified in claim 5 in which the sterilizing agents are germicidal lamps having upwardly acting reflectors.

WALDEMAR N. OLSON.